(12) United States Patent
Reddy et al.

(10) Patent No.: US 9,690,542 B2
(45) Date of Patent: Jun. 27, 2017

(54) SCALING DIGITAL PERSONAL ASSISTANT AGENTS ACROSS DEVICES

(71) Applicant: Microsoft Technology Licensing, LLC, Redmond, WA (US)

(72) Inventors: Mouni Reddy, Bellevue, WA (US); Vishwac Sena Kannan, Redmond, WA (US); Aleksandar Uzelac, Seattle, WA (US); Daniel J. Hwang, Renton, WA (US); Molly Rose Suver, Seattle, WA (US); Lisa Joy Stifelman, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 380 days.

(21) Appl. No.: 14/580,093

(22) Filed: Dec. 22, 2014

(65) Prior Publication Data
US 2016/0179464 A1    Jun. 23, 2016

(51) Int. Cl.
| | |
|---|---|
| *G06F 3/0481* | (2013.01) |
| *G06F 3/16* | (2006.01) |
| *G06F 9/44* | (2006.01) |
| *G10L 15/22* | (2006.01) |
| *G10L 15/18* | (2013.01) |
| *G10L 13/00* | (2006.01) |

(52) U.S. Cl.
CPC ............ *G06F 3/167* (2013.01); *G06F 9/4443* (2013.01); *G10L 15/22* (2013.01); *G10L 13/00* (2013.01); *G10L 15/1822* (2013.01)

(58) Field of Classification Search
CPC ...................................................... G06F 3/167
USPC ......................................................... 715/728
See application file for complete search history.

(56) References Cited

U.S. PATENT DOCUMENTS

| | | | |
|---|---|---|---|
| 7,961,856 B2 * | 6/2011 | Zellner ................. | H04M 3/493 379/100.15 |
| 8,706,503 B2 | 4/2014 | Cheyer et al. | |
| 9,392,088 B2 * | 7/2016 | Strazisar ............ | H04M 1/6008 |
| 2004/0044516 A1 * | 3/2004 | Kennewick ............ | G10L 15/22 704/5 |

(Continued)

OTHER PUBLICATIONS

International Search Report and Written Opinion for International Application No. PCT/US2015/064166, 11 pages, mailed Mar. 17, 2016.

(Continued)

*Primary Examiner* — Reza Nabi
(74) *Attorney, Agent, or Firm* — Klarquist Sparkman, LLP (57) ABSTRACT

A method for providing digital personal assistant responses may include receiving, by a digital personal assistant associated with a plurality of reactive agents, a user input initiating a dialog with the digital personal assistant within the computing device. In response to receiving the input, an operation mode of the computing device may be detected from a plurality of available operation modes. One of the plurality of reactive agents can be selected based on the received input. A plurality of response strings associated with the selected reactive agent can be accessed. At least one of the plurality of response strings is selected based at least on the operation mode and at least one hardware characteristic of the computing device. The selected at least one of the plurality of response strings is providing during the dialog, as a response to the user input.

18 Claims, 9 Drawing Sheets

(56) References Cited

U.S. PATENT DOCUMENTS

| | | | | |
|---|---|---|---|---|
| 2008/0141302 | A1* | 6/2008 | Ota | G08C 17/00 725/34 |
| 2010/0308958 | A1* | 12/2010 | Kim | G06F 3/017 340/5.1 |
| 2013/0185074 | A1* | 7/2013 | Gruber | G06F 17/3087 704/257 |
| 2013/0246920 | A1* | 9/2013 | Fields | G06F 9/44 715/728 |
| 2013/0275875 | A1* | 10/2013 | Gruber | G10L 15/22 715/728 |
| 2013/0304758 | A1* | 11/2013 | Gruber | G06F 17/30976 707/769 |
| 2014/0081633 | A1* | 3/2014 | Badaskar | G06F 17/30023 704/235 |
| 2014/0095168 | A1* | 4/2014 | Lynch | G10L 15/22 704/270.1 |
| 2014/0095171 | A1* | 4/2014 | Lynch | G10L 17/22 704/275 |
| 2014/0095172 | A1* | 4/2014 | Cabaco | G10L 21/06 704/275 |
| 2014/0095173 | A1* | 4/2014 | Lynch | G10L 15/22 704/275 |
| 2014/0218372 | A1* | 8/2014 | Missig | G06F 3/044 345/473 |
| 2014/0222436 | A1* | 8/2014 | Binder | G06F 3/167 704/275 |
| 2014/0253455 | A1* | 9/2014 | Mauro | G06F 3/167 345/169 |
| 2014/0258323 | A1* | 9/2014 | Mauro | G06F 17/30392 707/766 |
| 2014/0278413 | A1* | 9/2014 | Pitschel | G10L 15/063 704/243 |
| 2014/0278438 | A1* | 9/2014 | Hart | G06F 3/167 704/275 |
| 2014/0297284 | A1* | 10/2014 | Gruber | G10L 15/18 704/257 |
| 2014/0316764 | A1* | 10/2014 | Ayan | H04M 3/4936 704/9 |
| 2015/0193102 | A1* | 7/2015 | Lanier | G06F 3/017 715/746 |
| 2016/0027019 | A1* | 1/2016 | Michaelangelo | G06Q 10/06316 705/7.26 |
| 2017/0046124 | A1* | 2/2017 | Nostrant | G06F 3/167 |

OTHER PUBLICATIONS

"Second Written Opinion Issued in PCT Application No. PCT/US2015/064166", Mailed Date: May 30, 2016, 6 Pages.

"International Preliminary Report on Patentability Issued in PCT Application No. PCT/US2015/064166", Mailed Date: Sep. 22, 2016, 7 Pages.

Nerney, Chris, "How to Turn Google Now into a Powerful Personal Assistant", Published on: Nov. 12, 2013, Available at: http://www.citeworld.com/article/2114391/mobile-byod/google-now-getting-started.html.

"S Voice", Published on: Jun. 4, 2012, Available at: http://www.samsung.com/global/galaxys3/svoice.html.

Warren, Tom, "The Story of Cortana, Microsoft's Siri Killer", Published on: Apr. 2, 2014, Available at: http://www.theverge.com/2014/4/2/5570866/cortana-windows-phone-8-1-digital-assistant.

\* cited by examiner

| Device Operating Mode 310 | Output String (Display) 312 | Output String (Audio) 314 |
|---|---|---|
| Audio Only Mode 316 | Detailed Display String 318 | Detailed TTS String 320 |
| Fully Engaged Mode 322 | Low Detail Display String 324 | Short TTS String 326 |
| Semi-Distracted Mode 328 | Low Detail Display String 330 | Medium Detail TTS String 332 |
| Limited Display Mode 334 | Short Detailed String 336 | N/A |

SCALING DIGITAL PERSONAL ASSISTANT AGENTS ACROSS DEVICES

BACKGROUND

As computing technology has advanced, increasingly powerful mobile devices have become available. For example, smart phones and other computing devices have become commonplace. The processing capabilities of such devices has resulted in different types of functionalities being developed, such as functionalities related to digital personal assistants.

Digital personal assistants implemented within various mobile devices have interactive and built-in conversational understanding to be able to respond to user questions or speech commands. However, such responses from a digital personal assistant may not always be appropriate depending on the type of device that is being used. Some devices, for example, may not have a touch screen, and a response instructing a user to touch or press a button on-screen may not be feasible.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a method for providing digital personal assistant responses may include receiving, by a digital personal assistant associated with a plurality of reactive agents, a user input initiating a dialog with the digital personal assistant within the computing device. In response to receiving the input, an operation mode of the computing device may be detected from a plurality of available operation modes. One of the plurality of reactive agents can be selected based on the received input. A plurality of response strings associated with the selected reactive agent can be accessed. At least one of the plurality of response strings is selected based at least on the operation mode and/or at least one hardware characteristic of the computing device. The selected at least one of the plurality of response strings is providing during the dialog, as a response to the user input.

In accordance with one or more aspects, a computing device that includes a processor, a memory, and a microphone, may be adapted to perform a method for providing digital personal assistant responses. The method includes receiving, by a digital personal assistant, an input (e.g., text, voice, tactile, and so forth) generated by a user, where the input can be received via the microphone (in instances of a digital voice input). In response to receiving the input, an operation mode and/or at least one hardware characteristic of the computing device are detected. At least one of a plurality of response strings associated with a reactive agent for the digital personal assistant and a presentation mode for the at least one of the plurality of response strings are selected. The selecting of the at least one of the plurality of response strings and the presentation mode may be based at least on the operation mode and/or the at least one hardware characteristic. The at least one of the plurality of response strings may be provided using the presentation mode as a response to the digital voice input.

In accordance with one or more aspects, a computer-readable storage medium may include instructions that upon execution cause a computer system to receive, by a third-party application running on the computer system, an input generated by a user. The input may include a digital voice input, text input received by, e.g., typing, and/or any other types of user input (e.g., tactile input). A digital voice input may be received via a microphone. The microphone can be a built-in microphone within the computer system, a detachable microphone that can be connected to (attached) to the computer system via a wired connection, a remote listening device (e.g., a Bluetooth headset with a microphone) coupled to the computer system wirelessly, and/or a companion device with microphone and/or speaker capabilities (e.g., a smart watch). In instances when digital voice input is used, natural language processing using the digital voice input is performed to determine a user voice request. The user voice request is associated with one or more functionalities performed by an application running on the computer system. The application includes one or more reactive agents for performing the one or more functionalities. One of the one or more reactive agents can be selected for performing the one or more functionalities. Information identifying an operation mode and at least one hardware characteristic of the computer system is requested by the application, the requesting using an API request. In response to the API request, the information identifying the operation mode and/or the at least one hardware characteristic of the computer system is received. At least one of a plurality of response strings associated with the selected third-party reactive agent and a presentation mode for the at least one of the plurality of response strings are selected. The selecting of the at least one of the plurality of response strings and the presentation mode is based at least on the operation mode and/or the at least one hardware characteristic. The at least one of the plurality of response strings can be provided using the presentation mode, as a response to the user voice request.

As described herein, a variety of other features and advantages can be incorporated into the technologies as desired.

DETAILED DESCRIPTION

As described herein, various techniques and solutions can be applied for scaling digital personal assistant reactive agents across devices. More specifically, upon detecting a user input (e.g., voice input for a voice-controlled digital personal assistant, a text input such as typed input, tactile input and so forth), a reactive agent may be selected for assisting with performing a task associated with a device functionality and triggered by the user input. The digital personal assistant (or the agent) may then use a current device operating mode and one or more device capabilities (e.g., one or more device features or characteristics such as hardware characteristics) to customize a voice response dialog initiated in response to the user input. A response string may be selected based on the device operating mode and/or the one or more device capabilities. Additionally, the presentation mode for presenting the response string (e.g., audio only, display only, audio/display combination, how detailed the response string is, and so forth) may also be customized based on the device operating mode and/or the one or more device capabilities. In this regard, by using the hardware capabilities of the device type and how the user is likely to be engaged when interacting with the digital personal assistant (e.g., based on the device operating mode), the digital personal assistant may provide more relevant and efficient response experience, tailored to a particular device that is being used in a particular operating mode.

As used herein, the term "reactive agent" refers to a data/command structure which may be used by a digital personal assistant to implement one or more response dialogs (e.g., voice, text and/or tactile responses) associated with a device functionality. The device functionality (e.g., emailing, messaging, etc.) may be activated by a user input (e.g., voice command) to the digital personal assistant. The reactive agent (or agent) can be defined using a voice agent definition (VAD) or a reactive agent definition (RAD) XML document as well as programming code (e.g., C++ code) used to drive the agent through the dialog.

Figure 1:
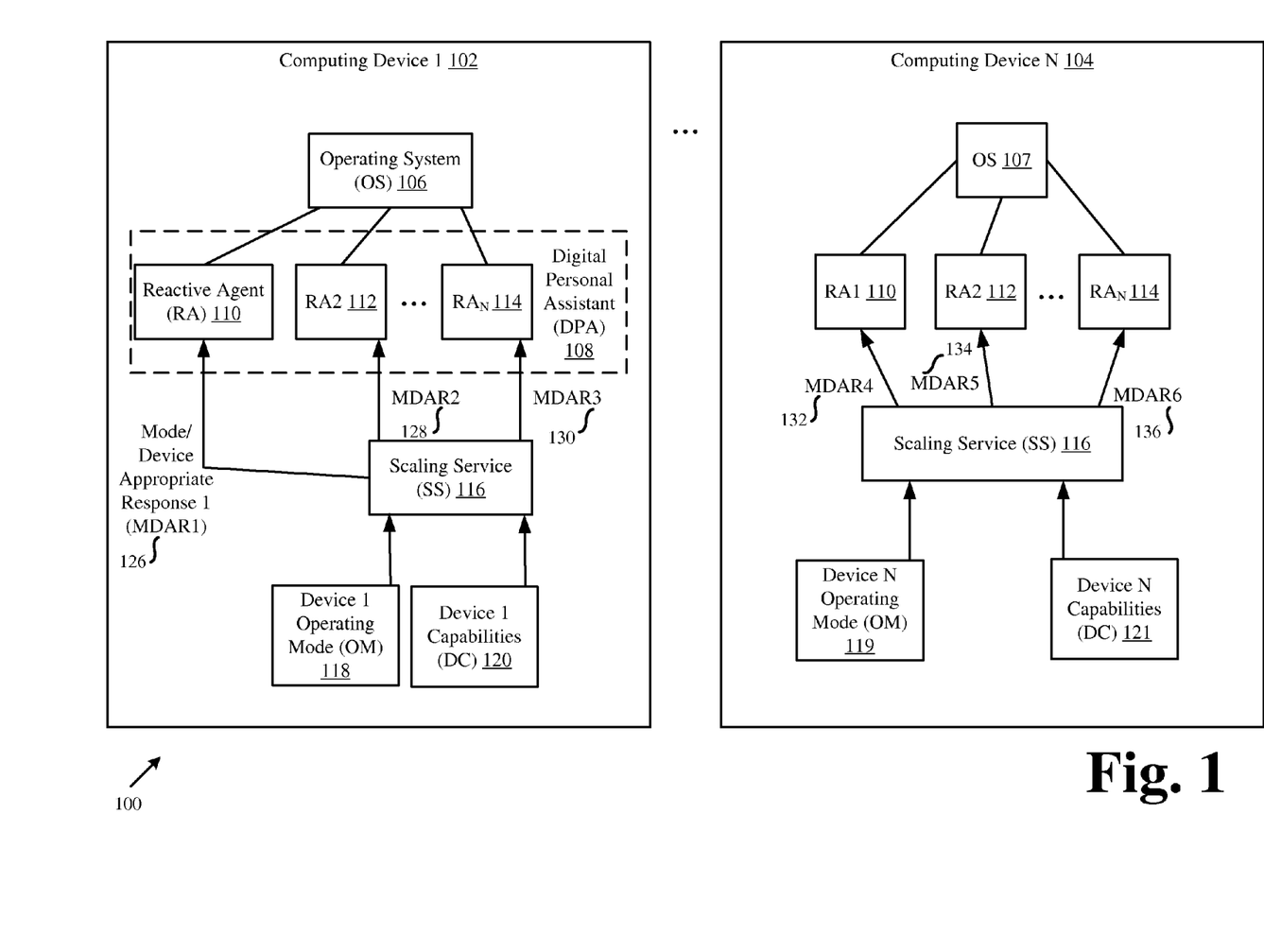
FIG. 1 is a block diagram illustrating example architecture for scaling digital personal assistant agents across computing devices with different device capabilities, in accordance with an example embodiment of the disclosure.

FIG. 1 is a block diagram illustrating example architecture 100 for scaling digital personal assistant agents across computing devices with different device capabilities, in accordance with an example embodiment of the disclosure. Referring to FIG. 1, the architecture 100 may include computing devices 102, . . . , 104, with each computing device having specific device capabilities (or characteristics) such as 120, . . . , 121, respectively. The computing devices 102, . . . , 104 can include desktop computers, laptop computers, netbooks, tablet computers, smartphones, or other computing devices that can execute an operating system (e.g., 106, . . . , 107) and a digital personal assistant 108 (which can be a voice-controlled digital personal assistant). Even though the digital personal assistant 108 is illustrated as installed on the computing device 102, the present disclosure is not limiting in this regard. For example, a companion device (e.g., a smart watch) may communicate with another device (e.g., a phone) which has the digital personal assistant installed on it. In this case, even though the companion device does not have the digital personal assistant installed on the device, it still may take advantage of the functionalities described herein by relying on the information (e.g., response strings) provided by the digital personal assistant installed on the second device (i.e., the phone). The digital personal assistant may also be part of a server in a cloud environment, which may be accessible by a plurality of other devices in the cloud environment.

Each of the computing devices 102, . . . , 104 may use a digital personal assistant (DPA) 108. The DPA 108 may comprise suitable logic, circuitry, interfaces, and/or code and may be operable to use one or more reactive agents (RAs), such as RAs 110, . . . , 114. The RAs may be used to perform one or more functionalities, which may be triggered by a user input (e.g., voice input) to the DPA 108. For example, RA 110 may be an email agent, which may be used to, based on user voice command, open a new email window, compose an email based on voice input, and send the email to an email address specified by the voice input. The RAs 110, . . . , 114 may also be used to provide one or more responses (e.g., audio/video/tactile responses) during a dialog session initiated with the DPA 108 based on the user input. More specifically, the RAs 110, . . . , 114 and the DPA 108 may use the scaling service 116 for obtaining mode/device appropriate responses (MDARs) 126, . . . , 130 and 132, . . . , 136. The MDARs can be responses (such as response strings) selected based on device operating mode and/or one or more device characteristics/capabilities.

In an example implementation, the selection of the response strings and/or a presentation mode for such responses may be further based on other factors, such as a user's distance from a device, the user's posture (e.g., laying down, sitting, or standing up), knowledge of the social environment around the user (e.g., are other users present), noise level, and current user activity (e.g., user is in an active conversation or performing a physical activity). For example, the user's current availability for an active engagement with the computing device may be determined based on knowledge of user's current activity (e.g., device may detect user is currently engaged in a conversation by detecting the user's voice; device may detect user is actively moving indicating a physical activity and, therefore, user unavailability to look at the device screen; device may detect no movement indicating user is not moving and full engagement with the device may be possible).

The user's distance from a device may be determined based on, for example, received signal strength when the user communicates with the device via a speakerphone. If it is determined that the user is beyond a threshold distance, the device may consider that the screen is not visible to the user and is, therefore, unavailable. In this instance, an MDAR may be selected and appropriate presentation mode may be further modified (e.g., audio-only presentation mode may be selected).

Figure 2:
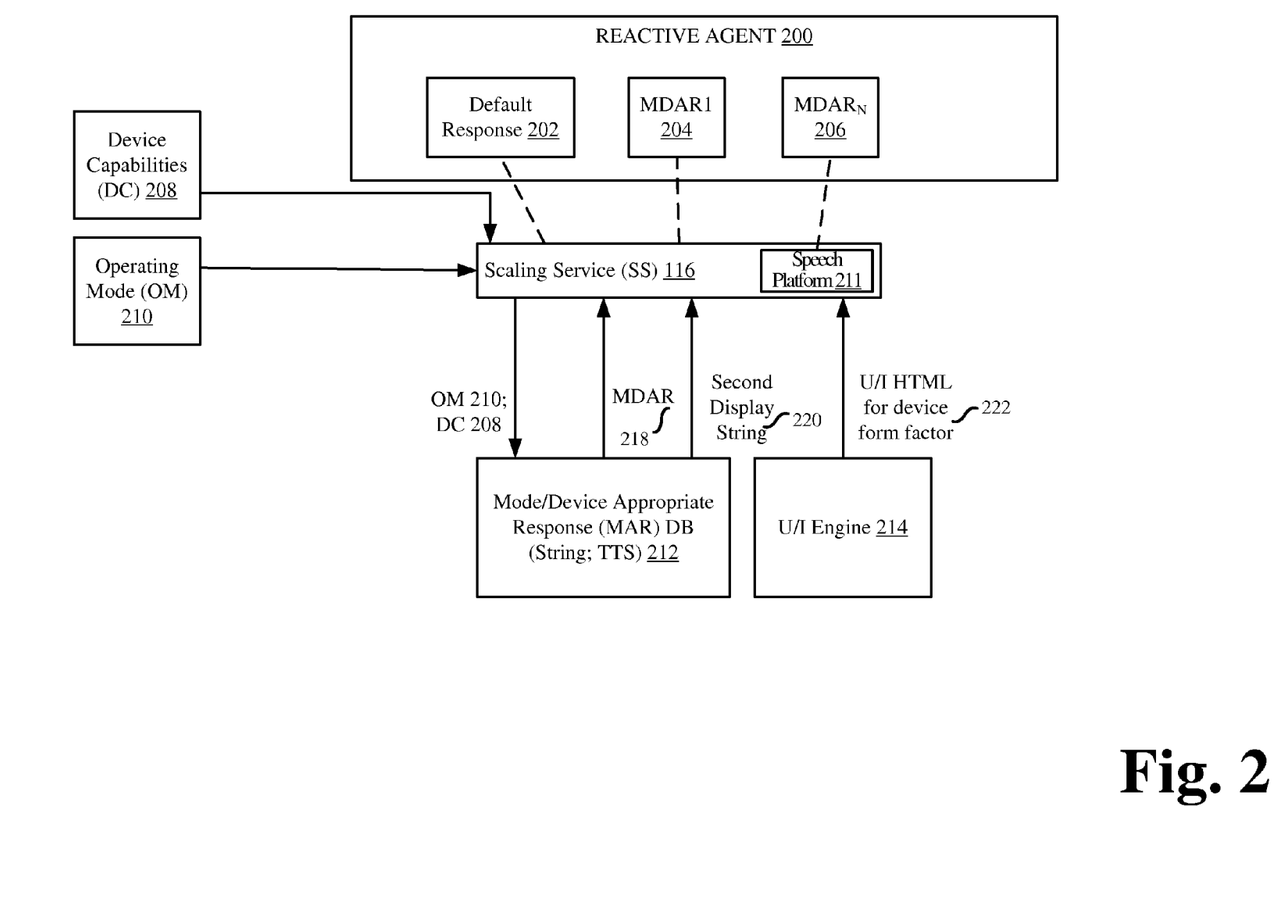
FIG. 2 is a block diagram illustrating an example reactive agent with a scaling service used in the architecture of FIG. 1, in accordance with an example embodiment of the disclosure.

The scaling service 116 may comprise suitable logic, circuitry, interfaces, and/or code and may be operable to generate the MDARs 126, . . . , 130 based on device operating mode information (e.g., 118, . . . , 119) and/or device capabilities (or device characteristics) information (e.g., 120, . . . , 121). More specifically, the scaling service 116 may determine the reactive agent that is currently active (e.g., in a dialog with a user using the DPA 108), and may access a plurality of response strings (or available dialog responses, e.g., as seen in FIG. 2) associated with the reactive agent. The scaling service 116 may then scale the response (e.g., by selecting an appropriate response) based on the device operating mode 118 and/or the device capabilities 120. For example, computing devices 102 and 104 may be with different device capabilities/characteristics (120 and 121; e.g., different device form factors). In this case, the scaling service 116 will select different mode/device appropriate responses 132, . . . , 136 for the same reactive agents 110, . . . , 114, respectively. In instances when the device operating mode 118 and/or the device capabilities 120 are not available, then a default response (e.g., 202 in FIG. 2) may be selected.

Even though the scaling service 116 is illustrated separately from the RAs and the DPA 108, the present disclosure may not be limited in this regard. In an example embodiment, the scaling service may be implemented as part of one or more of the reactive agents and/or as part of the digital personal assistant 108. Additionally, even though reactive agents 110, . . . , 114 are illustrated as native agents (i.e., implemented within the computing device 102, . . . , 104), one or more of the reactive agents may be implemented outside of the computing devices (e.g., in a server computer in a cloud environment, which is accessible by the computing devices 102, . . . , 104 via one or more communication networks).

FIG. 2 is a block diagram illustrating an example reactive agent with a scaling service used in the architecture of FIG. 1, in accordance with an example embodiment of the disclosure. Referring to FIG. 2, the example reactive agent 200 is a reactive agent associated with the digital personal assistant 108 (illustrated in FIG. 1). The scaling service 116, which is implemented separately from the reactive agent 200, is communicatively coupled to the responses database 212 and the user interface (U/I) engine 214.

The scaling service 116 may also include a speech platform 211, which may comprise suitable logic, circuitry, interfaces, and/or code and may be operable to perform speech-to-text and text-to-speech processing of information. The speech platform 211 may optionally be implemented outside of the scaling service 116. One or more applications running on the computing device 102 (e.g., third-party applications such as application 402 in FIG. 4) as well as the digital personal assistant 108 may interact with the scaling service 116 and one or more of the reactive agents 110, . . . , 114 using the speech platform 211. In this regard, the speech platform 211 abstracts communications with the reactive agents for the device 102 and/or the DPA 108. The device mode information 210 and/or the device capabilities information 208 may be initially provided to the speech platform 211, and then passed on to the scaling service 116 to use in obtaining mode/device appropriate responses from the database 212.

In operation, a user may initiate a dialog with the digital personal assistant 108 by providing user input. The input may include a digital voice input, text input received by, e.g., typing, and/or any other user input (e.g., tactile input). A digital voice input may be received via a microphone. The microphone can be a built-in microphone within the computing device, a detachable microphone that can be connected to (attached) to the computer system via a wired connection, a remote listening device (e.g., a Bluetooth headset with a microphone) coupled to the computer system wirelessly, and/or a companion device with microphone and/or speaker capabilities (e.g., a smart watch). In instances when a digital voice input is used, natural language processing (e.g., by the speech platform 211) using the digital voice input is performed to determine a user voice request. The user voice request may be associated with one or more functionalities performed by a digital personal assistant and/or an application running on the computing device. The digital personal assistant and/or the application may include one or more reactive agents (e.g., reactive agent 200) for performing the one or more functionalities.

The current device operating mode 210 and/or device capabilities/characteristics information 208 may be communicated to the speech platform 211 and the scaling service 116. The device capabilities/characteristics information 208 may include one or more of a display resolution, a display type/size, display availability, audio abilities (e.g., microphone availability, speaker availability), Bluetooth availability, and/or a device form factor associated with the computing device.

For example, a display type may include a full display type (there will be little to no restriction on the size of the response string/answer); an extended display type (may include a second/additional display that is not the primary device display so that multiple versions of the response string may be used for each of the available displays); a limited/small display type (a device with a small display, such as mobile phone without touch-screen capabilities, wearable devices, etc.); and no display devices (the device has only audio capabilities without any display).

The audio abilities may include text-to-speech (TTS) availability (the device is able to output audio which will help with giving the user information); no TTS availability (the device has no sound/speaker ability or the user has muted the speaker); and earcon only availability (e.g., the device can generated limited sounds, such as earcons (or beeps)).

Figure 3:
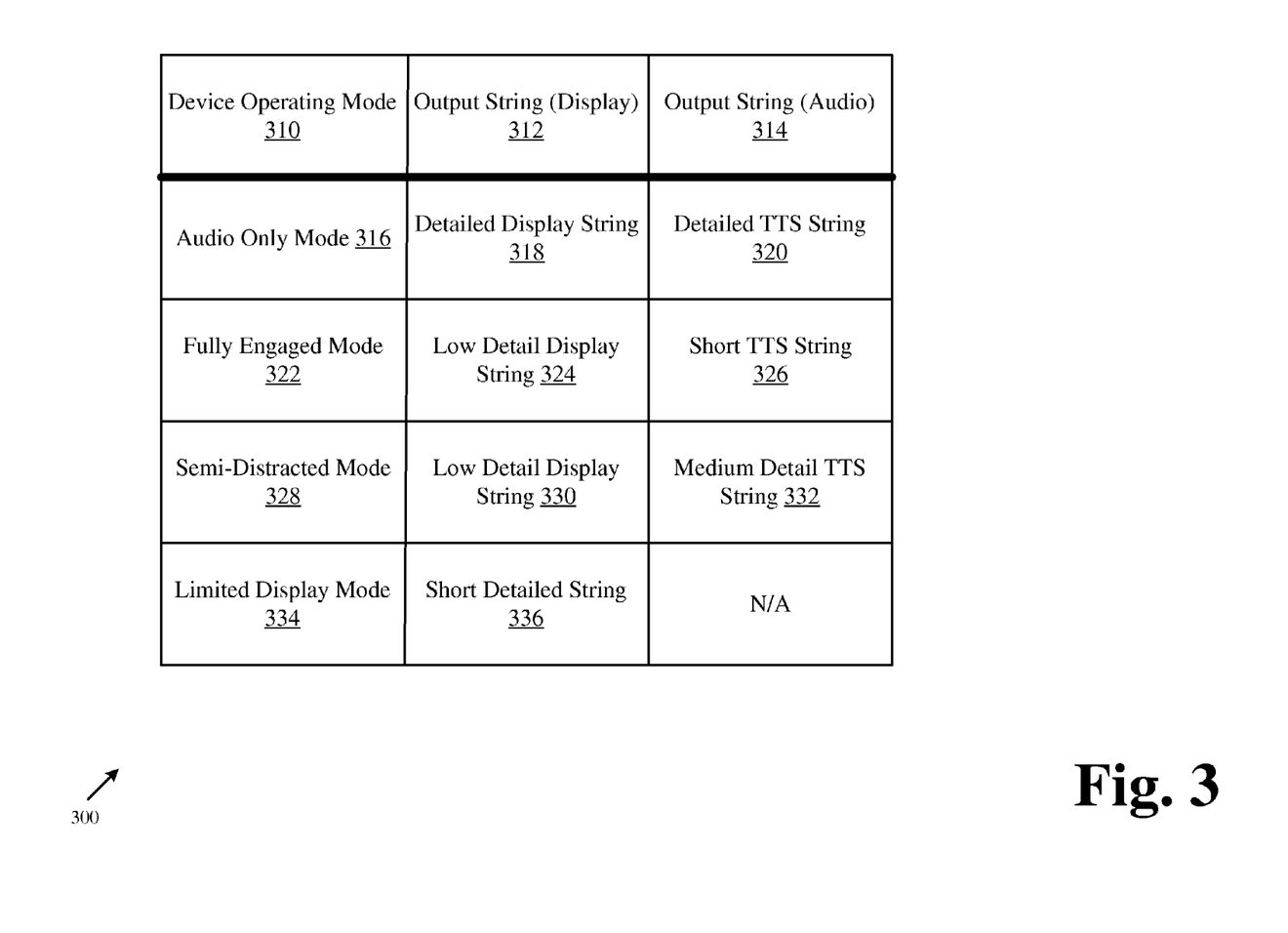
FIG. 3 is a block diagram illustrating a table with example device operating modes and corresponding output strings, in accordance with an example embodiment of the disclosure.

FIG. 3 is a block diagram illustrating a table with example device operating modes and corresponding output strings, in accordance with an example embodiment of the disclosure. Referring to FIG. 3, example device operating modes 310 are listed, with corresponding display output strings 312 and/or audio output strings 314.

The device operating mode 310 can include an audio only mode 316, a fully-engaged mode 322, a semi-distracted mode 328, and a limited display mode 334. Even though only four operating modes (316, 322, 328, and 334) are illustrated in FIG. 3, the disclosure is not limited in this regard and other operating modes and device types may also be used with the technologies disclosed herein. The audio only mode 316 may be used when the computing device has no physical display surface or when the device display is unavailable (e.g., main display is disconnected and a secondary display is active). In cases when the primary display is inactive and a secondary display is active, a detailed display string 318 may be presented as an output. A detailed TTS string 320 may also be presented (e.g., via a speaker).

A fully-engaged mode 322 may be used when a user is physically next to (in front of) the device and there is a high likelihood that the user is fully engaged with the device (e.g., a user is in front of a desktop computer or a laptop). In this case, a low detail display string 324 may be displayed and/or a short TTS string 326 may be presented as an audio output 314.

A semi-distracted mode 328 may be used when a user is in the vicinity of the computing device but the user is not fully engaged with the device (e.g., the user is driving and has his mobile phone with a digital personal assistant next to him). In this case, a low detail display string 330 may be displayed and/or a medium detail TTS string 332 may be presented as an audio output 314.

A limited display mode 334 may be used when the computing device is a secondary/peripheral device with a restricted display surface. In this case, a short display string 336 may be displayed as an output string 312.

A brief summary of the display and audio strings is provided herein below:

A detailed display string may be a text string intended to quickly summarize the information provided as an answer. The detailed display string may or may not provide complete information that may be expected as an answer. This type of display string may be used with the following example device form factors or operating modes: display not limited by real estate but sound is off, desktop with sound muted or audio out, electronic signboard, scrollable small screens with text-only ability, and/or extended displays for wearable devices.

A short detailed string may be a text string (e.g., 100 characters at most) and may support limited personality in the language and is more directed towards utility applications. This type of display string may be used with the following example device form factors or operating modes: wearable devices such as smart watches, thermostats, smart calculators, ovens, fridges, and so forth.

A low detail display string may be a text string that is a supporting string to a user experience with the digital personal assistant, and the string may be used to carry non-substantive information. This type of display string may be used with the following example device form factors or operating modes: a phone (when the user is currently looking at the device screen), a desktop computer, an automobile with smart device/display capabilities, a game console, and so forth.

A detailed TTS audio string may be a response string intended to quickly summarize the information provided as an answer during a dialog with the digital personal assistant. This type of audio TTS string may be used with the following example device form factors or operating modes: computing devices in audio-only mode, computing devices used while driving (a device may automatically switch to audio-only mode if use-while-driving is detected), an older generation smart device or mobile device without smart phone capabilities, and so forth.

A medium detail TTS audio string may provide useful response information, without the need for the response string to be as detailed as the response string provided during audio-only mode. This type of audio TTS string may be used with the following example device form factors or operating modes: a computing device used by a distracted user (e.g., a user uses another device and the user's mobile phone is on a table next to the user).

A short TTS audio string (or earcon only) may provide a very short readout. This type of audio TTS string may be used with the following example device form factors or operating modes: a gaming console, a TV, a desktop computer, and so forth.

Referring again to FIG. 2, after the speech platform 211 receives the device capabilities information 208 and the operating mode information 210, this information is used to access the responses database 212 and obtain one or more mode/device appropriate responses 218, such as MDARs 204, . . . , 206. Additionally, if the computing device 102 uses a second display (or another peripheral device with display/audio/tactile capabilities), then a second response string 220 may also be communicated back to the reactive agent 200 and then to the peripheral device (a direct communication from the database 212 to the peripheral device is also possible). Additionally, the scaling service 116 may use the user interface engine 214 to generate a U/I (e.g., an HTML U/I) 222, which is optimized for a device form factor and/or other device capabilities (e.g., capabilities/characteristics 208).

In an example embodiment, the reactive agent 200 may be used in connection with multiple devices. For example, two computing devices may be working together with one device being a primary device and the other device being a secondary/companion device. In this case, the agent (e.g., 200) may generate two responses (e.g., 204 and 206), one per each device type/mode.

In instances when device operating mode information 210 (and/or one or more of the device capabilities 208) is not available to the scaling service 116, then a default response 202 may be provided. The default response 202 may be agnostic to device capabilities and may be optimized for use in a plurality of device form factors (e.g., a dialog exchange between a user and the digital personal assistant for sending a text message may inquire about the message recipient and the message content).

Figure 4:
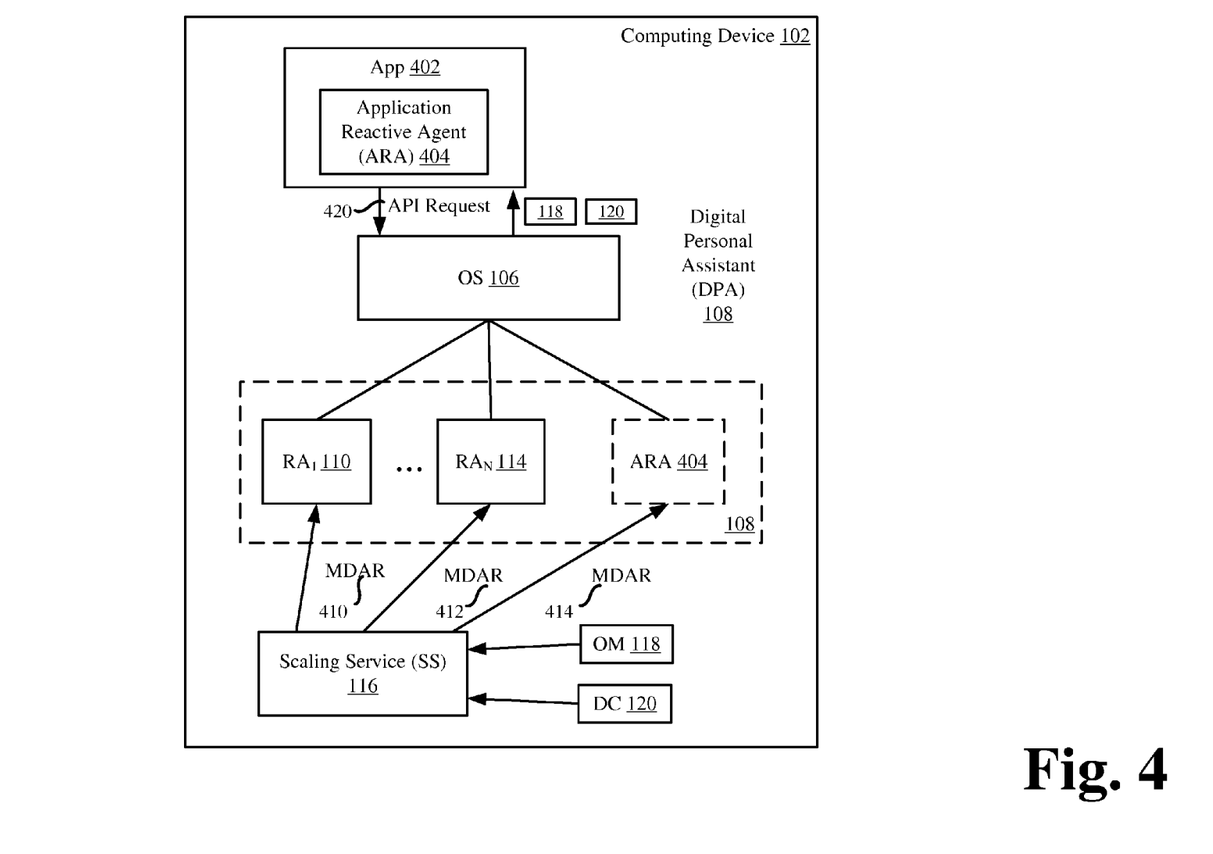
FIG. 4 is a block diagram of a computing device using an application reactive agent that can be scaled, in accordance with an example embodiment of the disclosure.

FIG. 4 is a block diagram of a computing device using an application reactive agent that can be scaled, in accordance with an example embodiment of the disclosure. Referring to FIG. 4, the computing device 102 may be running one or more applications, such as application (app) 402. The app 402 can be, for example, a third-party app or a native app provided with the device operating system. The app 402 may use one or more application reactive agents (ARAs), such as ARA 404. In an example embodiment, the ARA 404 may be implemented as part of the app 402 (or outside of the computing device 102, such as at a remote server that is communicatively coupled to the device 102). The ARA 404 may be operable to generate responses used by the app 402 when a dialog is initiated with a user of the app 402. In this regard, one or more of the functionalities described in reference to FIGS. 1-3 may be available to the app 402.

More specifically, the app 402 may use the scaling service 116 (which may also be implemented as part of the app 402) to provide mode/device appropriate responses. For example, if the scaling service 116 is implemented within the app 402 (or ARA 404), an API request 420 may be used to request mode and/or device capabilities information. The device mode information 118 and/or the device capabilities information 120 may be communicated to the app 402 for use by the scaling service 116 (in instances when the scaling service is part of the app 402). After communication with a response database (e.g., 212) and user interface engine (e.g., 214), a mode/device appropriate response may be generated and communicated to the app 402 or the ARA 404 for use by the app 402.

In another embodiment, the ARA 404 may be implemented as part of the device native agents 110, . . . , 114 (as indicated by dashed lines for 404 within the digital personal assistant 108). In this case, a mode/device appropriate response (e.g., 414) may be generated as described in reference to the native RAs 110, . . . , 114 in FIGS. 1-3. The MDAR 414 may then be communicated to the TPA 402 for use in a dialog initiated by a user of the app 402.

Figure 5:
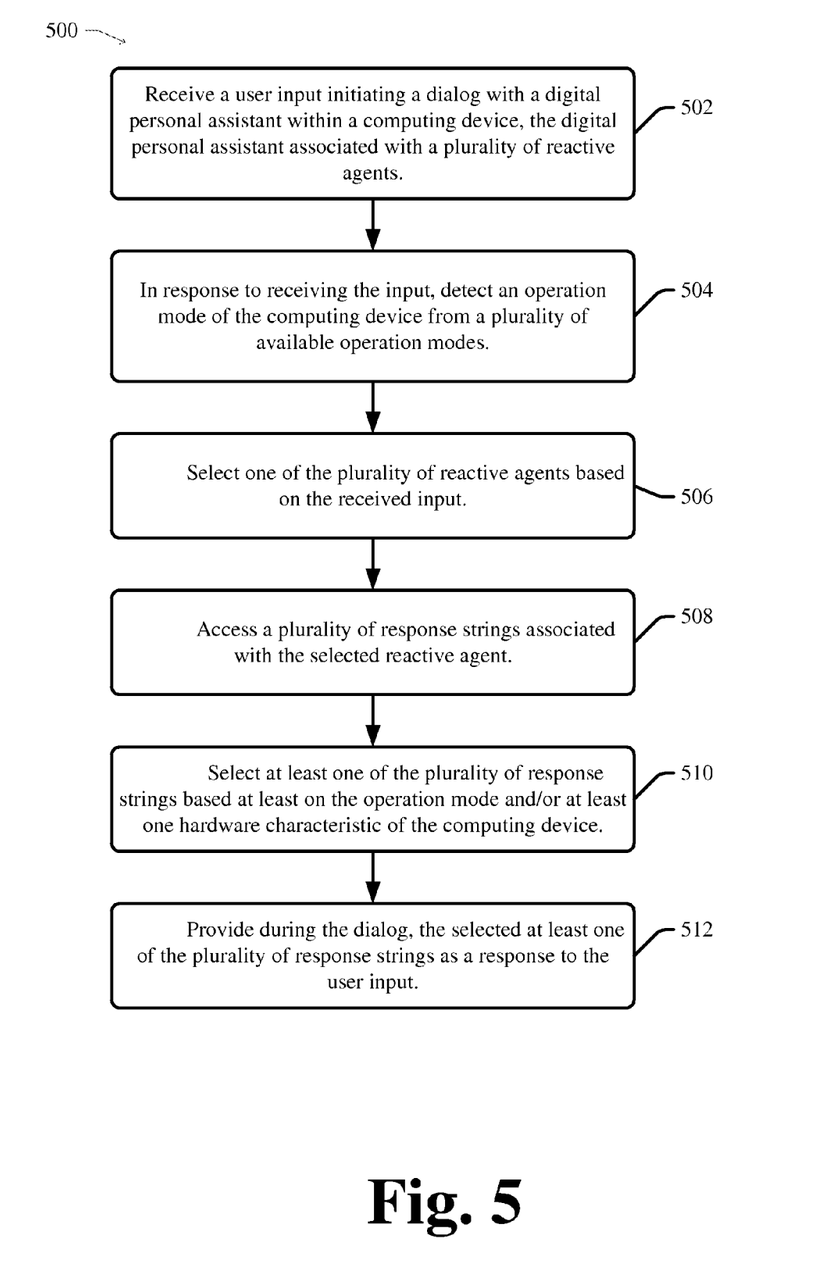
FIGS. 5-7 are flow diagrams illustrating scaling digital personal assistant agents across devices, in accordance with one or more embodiments.
Figure 6:
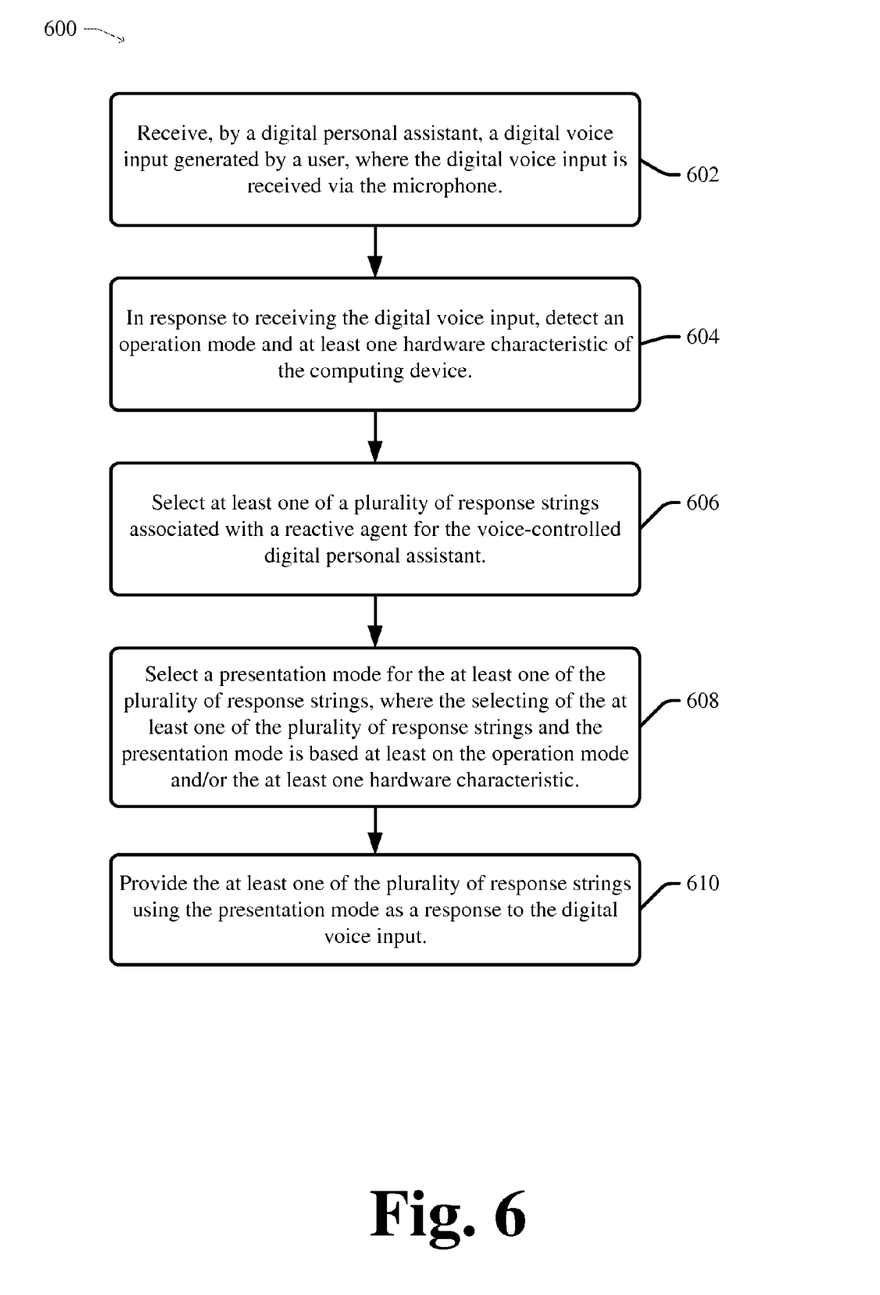
Figure 7:
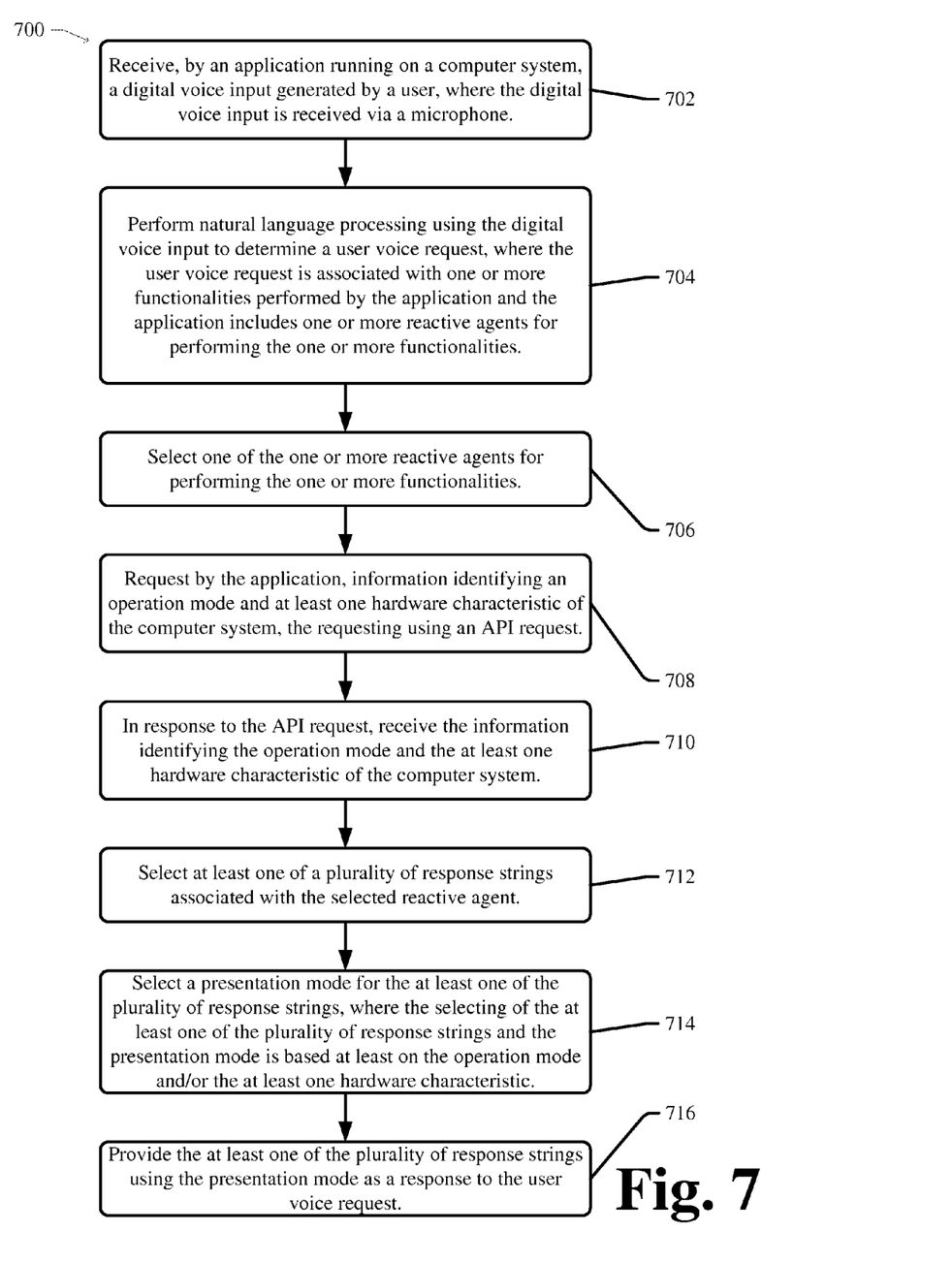

FIGS. 5-7 are flow diagrams illustrating scaling digital personal assistant agents across devices, in accordance with one or more embodiments. Referring to FIGS. 1-3 and 5, the example method 500 may start at 502, when the computing device 102 may receive a user input initiating a dialog with a digital personal assistant (e.g., DPA 108) within the computing device. The digital personal assistant 108 may be associated with a plurality of reactive agents, such as RAs 110, . . . , 114. At 504, in response to receiving the input, the operation mode (e.g., 118) of the computing device may be detected from a plurality of available operation modes (e.g., 316, 322, 328, and 334). At 506, the DPA 108 may select one of the plurality of reactive agents (e.g., 110) based on the received input. For example, one of the RAs may be selected based on the type of functionality (e.g., messaging, email, navigation, etc.) associated with the received user input. At 508, the scaling service 116 (and/or the reactive agent) may access a plurality of response strings (e.g., responses in the database 212) associated with the selected reactive agent. At 510, the scaling service 116 may select at least one of the plurality of response strings based at least on the operation mode (e.g., 118) and/or at least one hardware characteristic of the computing device (e.g., one or more of the device capabilities/characteristics 120). At 512, the selected at least one of the plurality of response strings may be provided by the scaling service 116 as a response to the user input.

Referring to FIGS. 1-3 and 6, the example method 600 may start at 602, when the digital personal assistant 108 may receive a digital voice input generated by a user. The digital voice input may be received via a microphone of the computing device 102. At 604, in response to receiving the digital voice input, the operation mode (e.g., 118) and at least one hardware characteristic (e.g., 120) of the computing device may be detected. At 606, the scaling service 116 may select at least one of a plurality of response strings (e.g., within the response database 212) associated with a reactive agent (e.g., one of the RAs 110, . . . , 114) for the digital personal assistant (e.g., 108). At 608, the scaling service 116 may select a presentation mode (e.g., as described in reference to FIG. 3) for the at least one of the plurality of response strings (e.g., for the returned MDAR 126 communicated to RA 110). The selecting of the at least one of the plurality of response strings and the presentation mode may be based at least on the operation mode (118) and/or the at least one hardware characteristic (120). At 610, the RA 110, the DPA 108 (and/or the scaling service 116) may provide the at least one of the plurality of response strings (e.g., MDAR 126) using the presentation mode as a response to the digital voice input.

Referring to FIGS. 1-4 and 7, the example method 700 may start at 702, when an application (e.g., app 402) running on the computer system (e.g., device 102), may receive a digital voice input generated by a user. The digital voice input may be received via a microphone of the computing device 102. At 704, the computing device 102 may perform natural language processing using the digital voice input to determine a user voice request (e.g., natural language processing may be performed by the speech platform 211 associated with the scaling service 116). The user voice request may be associated with one or more functionalities performed by the application (app 402) running on the computer system (e.g., device 102). The application (app 402) may include one or more application reactive agents (e.g., ARA 404) for performing the one or more functionalities.

At 706, the app 402 (and/or the DPA 108) may select one of the one or more application reactive agents for performing the one or more functionalities (e.g., ARA 404 may be selected). At 708, the application (app 402) may request information identifying an operation mode and/or at least one hardware characteristic of the computer system using an API request (e.g., 420). At 710, in response to the API request 420, the requested information identifying the operation mode (e.g., 118) and/or the at least one hardware characteristic (e.g., 120) of the computer system may be received at the app 402 (e.g., Information 118 and/or 120 is received by the app 402 when the app 402 implements the functionalities of the scaling service 116 and/or the DPA 108). At 712, at least one of a plurality of response strings associated with the selected reactive agent may be selected (e.g., MDAR 414 may be selected). At 714, a presentation mode for the at least one of the plurality of response strings may be selected by the scaling service 116. The selecting of the at least one of the plurality of response strings and the presentation mode may be based at least on the operation mode (118) and/or the at least one hardware characteristic (120). At 716, the at least one of the plurality of response strings (MDAR 414) may be provided using the presentation mode as a response to the user voice request.

Figure 8:
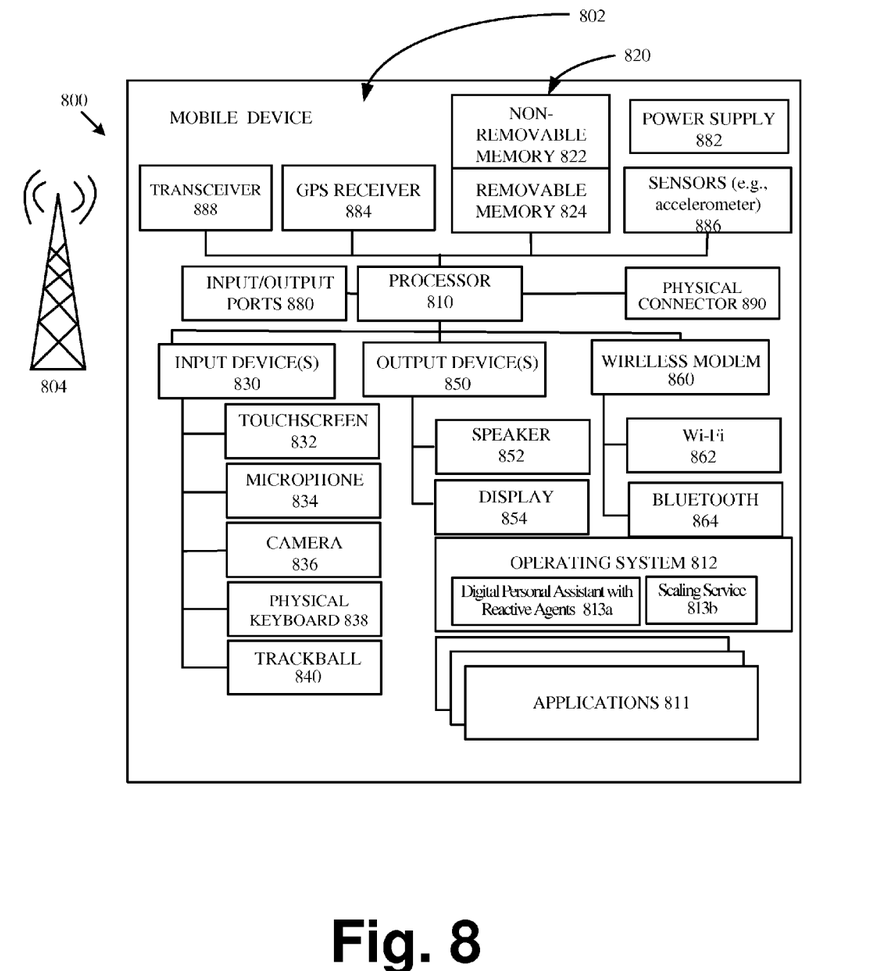
FIG. 8 is a block diagram illustrating an example mobile computing device in conjunction with which innovations described herein may be implemented.

FIG. 8 is a block diagram illustrating an example mobile computing device in conjunction with which innovations described herein may be implemented. The mobile device 800 includes a variety of optional hardware and software components, shown generally at 802. In general, a component 802 in the mobile device can communicate with any other component of the device, although not all connections are shown, for ease of illustration. The mobile device 800 can be any of a variety of computing devices (e.g., cell phone, smartphone, handheld computer, laptop computer, notebook computer, tablet device, netbook, media player, Personal Digital Assistant (PDA), camera, video camera, etc.) and can allow wireless two-way communications with one or more mobile communications networks 804, such as a Wi-Fi, cellular, or satellite network.

The illustrated mobile device 800 includes a controller or processor 810 (e.g., signal processor, microprocessor, ASIC, or other control and processing logic circuitry) for performing such tasks as signal coding, data processing (including assigning weights and ranking data such as search results), input/output processing, power control, and/or other functions. An operating system 812 controls the allocation and usage of the components 802 and support for one or more application programs 811. The operating system 812 may include a digital personal assistant with reactive agents 813a as well as a scaling service 813b. The scaling service 813b and the digital personal assistant with reactive agents 813a may have functionalities that are similar to the functionalities of the scaling service 116, the DPA 108 and the reactive agents (e.g., 110, . . . , 114, 404) as described in reference to FIGS. 1-4.

The illustrated mobile device 800 includes memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in Global System for Mobile Communications (GSM) communication systems, or other well-known memory storage technologies, such as "smart cards." The memory 820 can be used for storing data and/or code for running the operating system 812 and the applications 811. Example data can include web pages, text, images, sound files, video data, or other data sets to be sent to and/or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 800 can support one or more input devices 830, such as a touch screen 832 (e.g., capable of capturing finger tap inputs, finger gesture inputs, or keystroke inputs for a virtual keyboard or keypad), microphone 834 (e.g., capable of capturing voice input), camera 836 (e.g., capable of capturing still pictures and/or video images), physical keyboard 838, buttons and/or trackball 840 and one or more output devices 850, such as a speaker 852 and a display 854. Other possible output devices (not shown) can include piezoelectric or other haptic output devices. Some devices can serve more than one input/output function. For example, touchscreen 832 and display 854 can be combined in a single input/output device. The mobile device 800 can provide one or more natural user interfaces (NUIs). For example, the operating system 812 or applications 811 can comprise multimedia processing software, such as audio/video player.

A wireless modem 860 can be coupled to one or more antennas (not shown) and can support two-way communications between the processor 810 and external devices, as is well understood in the art. The modem 860 is shown generically and can include, for example, a cellular modem for communicating at long range with the mobile communication network 804, a Bluetooth-compatible modem 864, or a Wi-Fi-compatible modem 862 for communicating at short range with an external Bluetooth-equipped device or a local wireless data network or router. The wireless modem 860 is typically configured for communication with one or more cellular networks, such as a GSM network for data and voice communications within a single cellular network, between cellular networks, or between the mobile device and a public switched telephone network (PSTN).

The mobile device can further include at least one input/output port 880, a power supply 882, a satellite navigation system receiver 884, such as a Global Positioning System (GPS) receiver, sensors 886 such as an accelerometer, a gyroscope, or an infrared proximity sensor for detecting the orientation and motion of device 800, and for receiving gesture commands as input, a transceiver 888 (for wirelessly transmitting analog or digital signals), and/or a physical connector 890, which can be a USB port, IEEE 1394 (FireWire) port, and/or RS-232 port. The illustrated components 802 are not required or all-inclusive, as any of the components shown can be deleted and other components can be added.

The mobile device can determine location data that indicates the location of the mobile device based upon information received through the satellite navigation system receiver 884 (e.g., GPS receiver). Alternatively, the mobile device can determine location data that indicates location of the mobile device in another way. For example, the location of the mobile device can be determined by triangulation between cell towers of a cellular network. Or, the location of the mobile device can be determined based upon the known locations of Wi-Fi routers in the vicinity of the mobile device. The location data can be updated every second or on some other basis, depending on implementation and/or user settings. Regardless of the source of location data, the mobile device can provide the location data to map navigation tool for use in map navigation.

As a client computing device, the mobile device 800 can send requests to a server computing device (e.g., a search server, a routing server, and so forth), and receive map images, distances, directions, other map data, search results (e.g., POIs based on a POI search within a designated search area), or other data in return from the server computing device.

The mobile device 800 can be part of an implementation environment in which various types of services (e.g., computing services) are provided by a computing "cloud." For example, the cloud can comprise a collection of computing devices, which may be located centrally or distributed, that provide cloud-based services to various types of users and devices connected via a network such as the Internet. Some tasks (e.g., processing user input and presenting a user interface) can be performed on local computing devices (e.g., connected devices) while other tasks (e.g., storage of data to be used in subsequent processing, weighting of data and ranking of data) can be performed in the cloud.

Although FIG. 8 illustrates a mobile device 800, more generally, the innovations described herein can be implemented with devices having other screen capabilities and device form factors, such as a desktop computer, a television screen, or device connected to a television (e.g., a set-top box or gaming console). Services can be provided by the cloud through service providers or through other providers of online services. Additionally, since the technologies described herein may relate to audio streaming, a device screen may not be required or used (a display may be used in instances when audio/video content is being streamed to a multimedia endpoint device with video playback capabilities).

Figure 9:
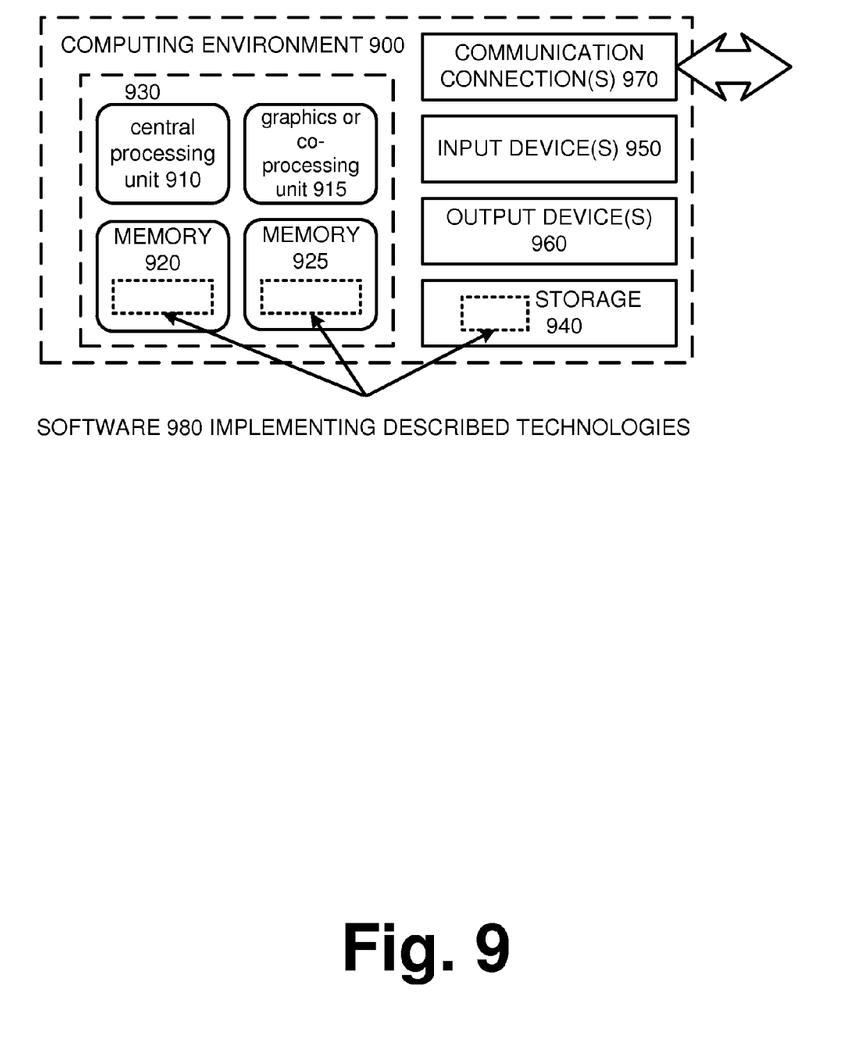
FIG. 9 is a diagram of an example computing system, in which some described embodiments can be implemented.

FIG. 9 is a diagram of an example computing system, in which some described embodiments can be implemented. The computing system 900 is not intended to suggest any limitation as to scope of use or functionality, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may also have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 9, computer-readable storage media include memory 920 and 925, and storage 940. The term "computer-readable storage media" does not include signals and carrier waves. In addition, the term "computer-readable storage media" does not include communication connections (e.g., 970).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. In a computing device with a digital personal assistant, a method for providing digital personal assistant responses, the method comprising:

receiving a user input initiating a dialog with the digital personal assistant within the computing device, the digital personal assistant associated with a plurality of reactive agents;

in response to receiving the input, detecting an operation mode of the computing device from a plurality of available operation modes;

selecting one of the plurality of reactive agents based on the received input;

accessing a plurality of response strings associated with the selected reactive agent;

selecting at least one of the plurality of response strings based at least on the operation mode and at least one hardware characteristic of the computing device;

providing during the dialog, the selected at least one of the plurality of response strings as a response to the user input;
detecting at least one peripheral device communicatively coupled to the computing device;
selecting at least a second one of the plurality of response strings based at least on the operation mode and at least one hardware characteristic of the at least one peripheral device; and
providing at the at least one peripheral device during the dialog, the selected at least a second one of the plurality of response strings.

2. The method according to claim 1, wherein the at least one hardware characteristic of the computing device comprises one or more of: a display resolution, a display size, display availability, microphone availability, speaker availability, Bluetooth availability, and a device form factor associated with the computing device.

3. The method according to claim 1, wherein the operation mode is one of:
an audio only operation mode;
a semi-distracted operation mode;
a fully-engaged operation mode; and
a limited display operation mode.

4. The method according to claim 1, further comprising:
selecting a presentation mode for the at least one of the plurality of response strings based at least in part on the operation mode and the at least one hardware characteristic of the computing device; and
modifying the presentation mode selection based on at least one of: the user's distance from the computing device, a noise level in the vicinity of the computing device, and the user's current availability for an active engagement with the computing device.

5. The method according to claim 4, wherein the presentation mode comprises at least one of:
an audio output of a text-to-speech representation of the selected at least one of the plurality of response strings;
a visual output of the selected at least one of the plurality of response strings; and
a tactile output associated with the selected at least one of the plurality of response strings.

6. The method according to claim 1, further comprising:
generating a user interface for presenting the selected at least one of the plurality of response strings, the user interface based at least in part on the at least one hardware characteristic of the computing device.

7. The method according to claim 1, wherein the user input is a voice input and the method further comprises:
detecting at least one requested functionality of the digital personal assistant based on the voice input; and
selecting the one of the plurality of reactive agents to perform the at least one requested functionality.

8. A computing device that includes a processor, a memory, and a microphone, the computing device being adapted to perform a method for providing digital personal assistant responses, the method comprising:
receiving, by a digital personal assistant, a digital voice input generated by a user, wherein the digital voice input is received via the microphone;
in response to receiving the digital voice input, detecting an operation mode and at least one hardware characteristic of the computing device;
selecting at least one of a plurality of response strings associated with a reactive agent for the digital personal assistant;
selecting a presentation mode for the at least one of the plurality of response strings, wherein the selecting of the at least one of the plurality of response strings and the presentation mode is based at least on the operation mode and the at least one hardware characteristic of the computing device;
providing the at least one of the plurality of response strings using the presentation mode as a response to the digital voice input;
detecting at least one peripheral device communicatively coupled to the computing device;
selecting at least a second one of the plurality of response strings based at least on the operation mode and at least one hardware characteristic of the at least one peripheral device; and
providing at the at least one peripheral device, the selected at least a second one of the plurality of response strings.

9. The computing device according to claim 8, wherein the at least one hardware characteristic of the computing device comprises one or more of: a display resolution, a display size, display availability, microphone availability, speaker availability, Bluetooth availability, and a device form factor associated with the computing device.

10. The computing device according to claim 8, wherein the operation mode is an audio only operation mode and the method further comprises:
converting the at least one of the plurality of response strings to a voice response audio output using text-to-speech (TTS) conversion; and
providing the voice response audio output as the response to the digital voice input.

11. The computing device according to claim 8, wherein the operation mode is one of a semi-distracted operation mode and a fully-engaged operation mode, and the method further comprises:
converting the at least one of the plurality of response strings to a voice response audio output using text-to-speech (TTS) conversion; and
providing one or both of the voice response audio output and a display output of the at least one of the plurality of response strings as the response to the digital voice input.

12. The computing device according to claim 8, wherein the operation mode is a limited display operation mode and the method further comprises:
providing the at least one of the plurality of response strings on a display of the computing device, as the response to the digital voice input.

13. The computing device according to claim 8, wherein the method further comprises:
performing natural language processing using the digital voice input to determine a user voice request, wherein the user voice request is a request for initiating a first dialog with the digital personal assistant.

14. The computing device according to claim 13, wherein the method further comprises:
detecting another digital voice input for initiating a second dialog with the digital personal assistant;
upon initiating the second dialog, detecting a change in at least one of the operation mode and the at least one hardware characteristic of the computing device.

15. The computing device according to claim 14, wherein the method further comprises:
when at least one of the operation mode and the at least one hardware characteristic of the computing device has changed upon initiating the second dialog, updating a selection of the at least one of the plurality of response strings and the presentation mode based on the changed at least one of the operation mode and the at least one hardware characteristic of the computing device.

16. A computer-readable storage medium including instructions that upon execution cause a computer system to:
receive, by an application running on the computer system, a digital voice input generated by a user, wherein the digital voice input is received via the microphone;
perform natural language processing using the digital voice input to determine a user voice request, wherein:
the user voice request is associated with one or more functionalities performed by the application running on the computer system; and
the application comprises one or more reactive agents for performing the one or more functionalities;
select one of the one or more reactive agents for performing the one or more functionalities;
request by the application, information identifying an operation mode and at least one hardware characteristic of the computer system, the requesting using an API request;
in response to the API request, receive the requested information identifying the operation mode and the at least one hardware characteristic of the computer system;
select at least one of a plurality of response strings associated with the selected reactive agent;
select a presentation mode for the at least one of the plurality of response strings, wherein the selecting of the at least one of the plurality of response strings and the presentation mode is based at least on the operation mode and the at least one hardware characteristic of the computer system;
provide the at least one of the plurality of response strings using the presentation mode as a response to the user voice request;
detecting at least one peripheral device communicatively coupled to the computer system;
selecting at least a second one of the plurality of response strings based at least on the operation mode and at least one hardware characteristic of the at least one peripheral device; and
providing at the at least one peripheral device, the selected at least a second one of the plurality of response strings.

17. The computer-readable storage medium according to claim 16, wherein the instructions, upon execution further cause the computer system to:
provide the selected reactive agent with a plurality of native reactive agents within the digital personal assistant.

18. The computer-readable storage medium according to claim 16, wherein the operation mode is one of a semi-distracted operation mode and a fully-engaged operation mode, and wherein the instructions, upon execution further cause the computer system to:
convert the at least one of the plurality of response strings to a voice response audio output using text-to-speech (TTS) conversion; and
provide one or both of the voice response audio output and a display output of the at least one of the plurality of response strings as the response to the digital voice input.

* * * * *